United States Patent [19]

Nagy et al.

[11] 4,442,131
[45] Apr. 10, 1984

[54] ANGLED DOUGH CUTTER

[75] Inventors: Alex J. Nagy, Mississauga; William G. Reed, Toronto, both of Canada

[73] Assignee: Margaret's Fine Food Ltd., Toronto, Canada

[21] Appl. No.: 223,322

[22] Filed: Jan. 8, 1981

[30] Foreign Application Priority Data

Jan. 8, 1980 [CA] Canada ................................. 343223

[51] Int. Cl.³ .................... B29F 3/08; A21C 3/04; A21C 11/10; A21C 11/16
[52] U.S. Cl. ...................................... 426/518; 83/580; 425/287; 425/308; 425/311; 425/465; 426/499
[58] Field of Search ............... 425/287, 288, 308, 310, 425/289, 309, 311, 461; 426/439, 516, 518, 438, 512, 514, 496, 499; 99/353, 354; 83/580

[56] References Cited

U.S. PATENT DOCUMENTS

| 1,359 | 10/1839 | Whittemore | 251/300 |
|---|---|---|---|
| 129,263 | 7/1872 | Zwietusch | 251/300 |
| 262,998 | 8/1882 | Trott | 425/287 |
| 1,164,195 | 12/1915 | Kendall | 251/300 |
| 1,502,578 | 7/1924 | Leisenring | 251/300 |
| 2,383,724 | 8/1945 | Klein | 251/300 |
| 3,152,560 | 10/1964 | Fries | 426/439 |
| 3,207,470 | 9/1965 | Kuckhoff | 251/300 |
| 3,782,876 | 1/1974 | Groff | 425/311 |
| 3,863,662 | 2/1975 | Zehr | 251/300 |

FOREIGN PATENT DOCUMENTS 23285 of 1906 United Kingdom ................ 251/300

Primary Examiner—Willard E. Hoag
Attorney, Agent, or Firm—Ridout & Maybee

[57] ABSTRACT

A machine for extruding and cutting yeast raised dough for making solid donuts or bismarcks is described herein which employs a discharge tube angled from the horizontal and changes within the discharge tube and to the discharge tube outlet in order to create a circular donut or other desired shape.

8 Claims, 7 Drawing Figures

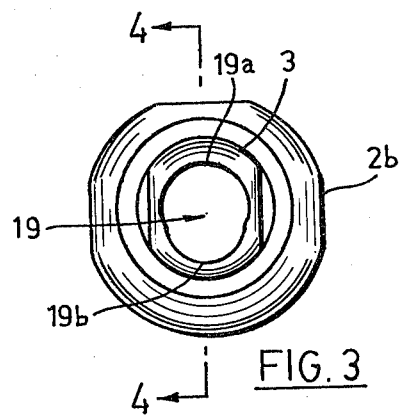
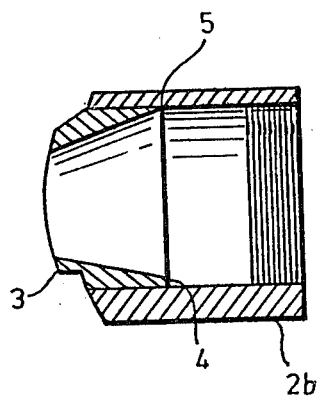
FIG. 3          FIG. 4
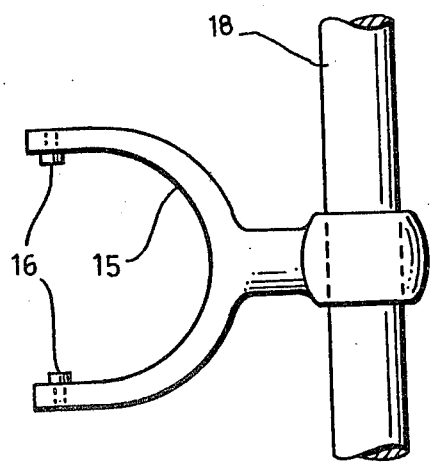
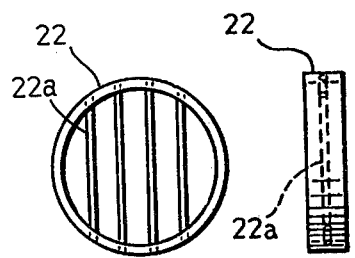
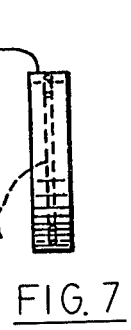
FIG. 5          FIG. 6          FIG. 7

ANGLED DOUGH CUTTER

This invention relates to an improved method of cutting dough, specifically, dough used for making baked or fried products. It is especially adapted for making a circular donut but can be modified for other shapes and products. More specifically this invention has been designed as an improvement in the manufacture of yeast-raised donuts such as jelly donuts or bismarcks.

Conventionally, dough is inserted into overhead hoppers which are pressurized with air. The air forces the dough down through an extrusion and cutting device known as a bismarck cutter. In the prior art, this device consisted of a vertical extrusion or discharge tube with a circular outlet opening. On the tube is mounted a cutting knife journaled for pivoting across the outlet opening thereby cutting the dough and momentarily closing the opening. The knife than reverses itself and pivots back to open the opening. The dough falls in balls onto conventional conveyor trays and is transferred to a proofer for raising, and after the dough has risen, it is fried.

Although the prior art bismarck cutters contained a circular discharge tube and opening, they did not produce a circular donut. This was due primarily to two factors. First, the pivoting action of the cutting knife across the opening blocked the opening for a longer period of time in the area of the opening which was reached first by the approaching knife and opened last by the knife receding. Thus more dough was extruded in one part of the opening, than in the other. Secondly, a yeast dough has a tendency to stick to the knife of the conventional vertical bismarck cutter. Therefore the dough is not cut cleanly and does not fall evenly onto the conveyor trays.

The stickiness and distortion problem can be overcome to some extent by using a drier dough. However, in order to increase shelf life, it is generally desirable to have a moister donut than is possible with the vertical bismarck cutter.

Even with a dry dough, however, it is not possible to produce a circular donut because of the problems described. The conventional bismarck cutter produces an oval donut whose longest axis is usually 25% longer than its shortest axis.

In one primary aspect of this invention, the discharge tube of the bismarck cutter is placed at an angle so that its end surface defines an outlet opening inclined from a horizontal surface. The outlet opening has a longest dimension along the incline and the knife is mounted for cutting movement across the opening along the longest dimension from top to bottom so that dough can fall away from the knife as it is cut.

In another aspect of the invention, the cutting action of the knife is also improved by the use of an inlet tube communicating with the angled discharge tube. The inlet tube is vertical and transfers dough from a hopper overhead. There is thus an angle formed between the inlet tube and the discharge tube. In the preferred embodiment, the knife is activated by a collar sliding up and down the inlet tube. Because of the angle formed between the disharge tube and the inlet tube, the travel of the collar along the inlet tube causes the knife to move faster along the last part of its stroke. This "snap" action also encourgages a clean cut and enables the use of a wetter dough. With this invention, approximately 17% more water can be used in the dough than in the vertical cutter.

The angled discharge tube, while it produces a clean cut, itself creates a distortion as can be seen if a circle, tilted at 45° from the horizontal, is projected onto a horizontal surface. In this case the projection will be oval with its longest axis at right angles to the direction of knife travel. In order to compensate for this, where a circular donut is desired, the opening is elongated in the direction of knife travel so that dough has a tendency to fall onto the conveyor in a ball and form a circular body thereon.

Another aspect of the invention compensates for the differential in time caused by the knife that different parts of the opening can extrude dough by making the upper portion of the opening nearest the advancing knife larger than the portion of the opening farthest away from the knife. Further, a ridge to impede dough flow is formed at the bottom of the discharge tube outlet in the area reached last by the advancing knife and thus open the longest length of time.

The changes made to the shape of the opening and the ridge formed in the discharge tube are aided by the addition of the inlet tube in the preferred embodiment. The angle thus formed between the inlet tube and the discharge tube also in part compensates for the differential time that different parts of the opening are open. As the dough comes down the vertical inlet tube it reaches the top part of the discharge tube first at the throat of the tube formed by the inside angle between discharge and inlet tubes. The dough reaches the bottom part of the discharge tube later, at the external angle or cheek. Dough passing by the cheek encounters a longer passage and relatively greater friction than dough passing by the throat. This causes more dough to flow through the upper portion of the discharge tube and more dough to exit at the upper part of the opening, the area of the opening which is closed the longest by the pivoting knife.

Changes to the shape of the discharge tube opening in part compensate for the action of the knife and in part compensate for the vertical angle of the discharge tube which is introduced into the invention to obtain a cleaner cut. With this invention it is possible to produce a substantially circular donut whose longest diameter is less than 5% longer than its shortest diameter.

The foregoing discussion will become clearer and the nature of the invention more apparent when viewed in the light of the following detailed description of the accompanying drawings in which:

FIG. 3 is a head-on view of the opening in the discharge tube from A in FIG. 1.

FIG. 4 is a cross-section side view of the die housing along line 4—4 in FIG. 3.

FIG. 5 is a plan view of the main fork shaft and fork.

FIG. 6 is a top of the restrictor contained in the discharge tube.

FIG. 7 is a side view of the restrictor contained in the dischaerge tube.

Figure 1:
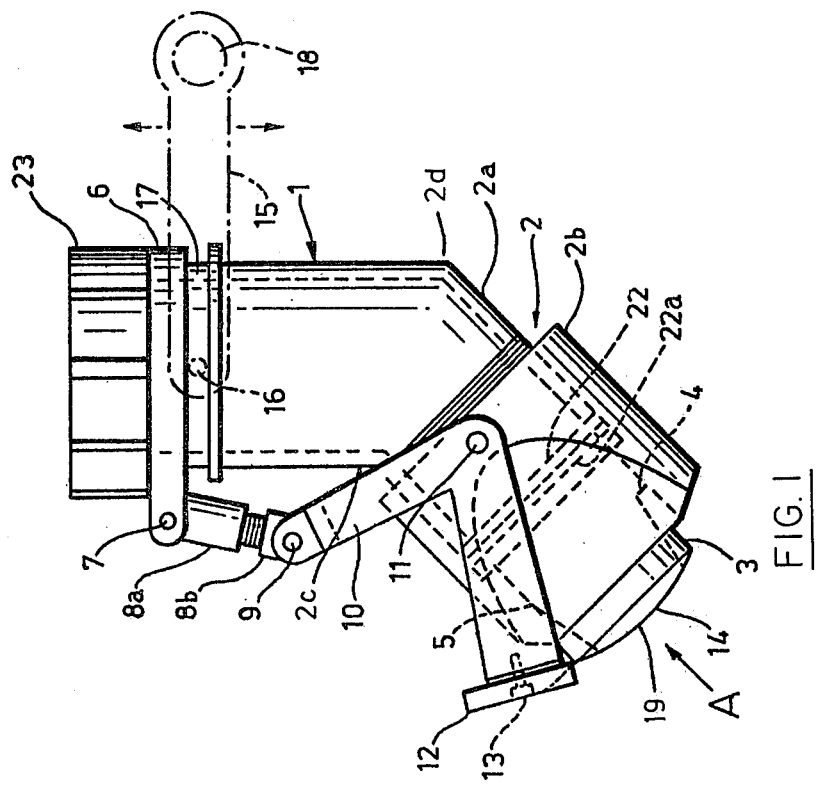
FIG. 1 is a side elevational view of the cutter assembly.
Figure 2:
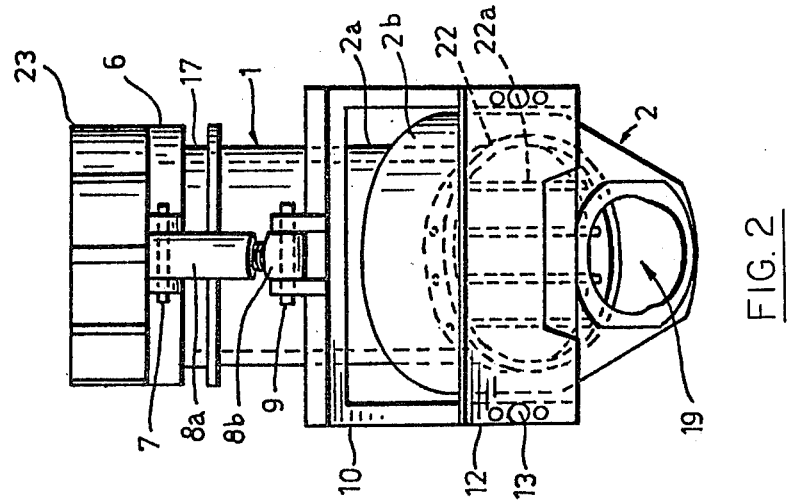
FIG. 2 is a front elevational view of the cutter of FIG. 1.

As shown in FIG. 1, the bismarck dough cutter preferred embodiment consists of a steel inlet tube 1 and a steel discharge tube 2. The discharge tube 2 is welded to the inlet tube 1 at an angle of approximately 45°. This angle forms a throat to the tube at 2c and a cheek at 2d.

The discharge tube 2 consists of two pieces—the tube 2a and screwed onto it the die housing 2b. The internal diameter of the inlet tube 1 is the same as that of the discharge tube 2, approximately 1¾". However the die housing 2b has inserted into it a bushing 3 which can be best seen in FIG. 3. This bushing is smaller than the internal diameter of the die housing 2b and is so shaped that a ridge 4 seen in FIGS. 1 and 4 is formed along the lower portion of the discharge tube 2. At its deepest point this ridge narrows the discharge tube passageway by approximately 0.6 centimeters. This ridge gradually diminishes along the upper surface so that the bushing is almost flush with the internal diameter of the discharge tube at 5.

The inlet tube 1 is provided with a sliding collar 6 which is connected via the hinge pin 7, the female and male volume adjuster 8a and 8b, the hinge pin 9 to the cutter knife arm 10. The knife arm is equipped with cutter knife 12 held in place by screws 13. The cutter arm is hinged at 11 for rotation across the outlet 14 formed by the die 2b and the bushing 3. The outlet face is curved with an arc of a radius measured from the pivot pin 11 to the outlet face so that the cutter knife pivots snugly across the outlet face.

The sliding collar 6 can slide up and down on the inlet tube 1 and is activated by a fork 15 equipped with members 16 to be inserted in grooves 17 of collar 6. The fork is connected to a fork shaft 18 which is moved up and down by means of an air cylinder.

The distance that the sliding collar 6 must travel along inlet tube 1 to create movement of the knife 12 along outlet face 14 is greatest during the top half of the knife stroke. Thus the collar 6 travels about twice as far along inlet tube 1, to move the knife 12 half way across the outlet face 14, during the first part of its downward stroke as it does to complete its stroke and close the outlet completely during the second part of its downward stroke. Since the fork and collar move at a uniform rate, the result is a knife "snap" action which moves faster as it finishes the cut than when it begins it.

As shown in FIG. 3, the bushing 3 is inserted into die housing 2b and contains the outlet opening 19. The opening is composed of two eccentric bores whose centres are spaced apart one-fifth of the length of the distance between 19a and 19b and in which the top bore 20 has a diameter of 85% of the distance between 19a and 19b and the bottom bore 21 has a diameter 75% of the distance between 19a and 19b.

As shown in FIGS. 1 & 6, the discharge tube contains a restricter 22 as shown which is held against the discharge tube 2a by the threaded die housing 2b. The restricter contains bars 22a which even out dough flow and help remove air bubbles.

It should be borne in mind that the dough is compressable and is forced down through the tube by air pressure it will expand as it comes out of the outlet opening 19 and is quickly cut by the knife 13. The cutter normally operates at twenty-four cuts per minute at a hopper pressure of 12-15 lbs. per sq. in.

The whole assembly is attached to the underside of a dough hopper by threaded mounting nut 23.

The assembly has been described for the desired circular shape, but it can be adapted to produce other shapes such as ovals and egg-shapes or substantially rectangle or square shapes as thought desirable.

While the bushing 3 can be made of any conventional metal, we have found that brass withstands corrosion better than aluminum which was used in earlier models.

The embodiments of the invention in which an exclusive property or privilege is claimed are defined as follows:

1. A method of cutting donuts of a desired shape which comprises the steps of
    (a) forcing dough under pressure into a discharge tube having a lower end face inclined at an angle from the horizontal and defining but a single through outlet opening;
    (b) extruding the dough under pressure through the outlet opening which is longer vertically than horizontally and larger on the top than on the bottom;
    (c) cutting the dough with a knife mounted for cutting movement across the outlet opening from top to bottom while said dough is extruding.

2. A method as in claim 1 in which the dough is first forced through a vertical inlet tube communicating with the discharge tube.

3. In a machine for extruding and cutting raised dough the improvement comprising
    (a) a substantially vertical dough inlet tube;
    (b) a dough discharge tube and end surface below the inlet tube, communicating therewith and angled therefrom;
    (c) the discharge tube end surface defining but a single through outlet opening;
    (d) the end surface defining the outlet opening being inclined from a horizontal surface and having a longest dimension along the incline;
    (e) a knife mounted for cutting movement across the opening along the longest dimension from top to bottom;
    (f) the opening defined by the discharge tube being larger at the point reached first by the knife and smaller at the point reached last; and
    (g) a horizontally disposed conveyor positioned to receive material extruded from the opening and cut by the knife
so that dough extruded from the opening and cut off by the knife will define a substantially circular body when it falls onto the conveyor.

4. The machine of claim 3 in which the end surface is defined by a removable die.

5. The machine of claim 3 in which the knife moves along the end surface defining the opening.

6. The machine of claim 5 in which the discharge tube is angled at approximately 45° from the inlet tube.
,13

7. A dough cutter as in claim 6 in which the shape of the outlet opening is defined by two eccentric circles whose centres are spaced apart one-fifth of the length of the opening in the direction of travel of the knife and in which the top circle has a diameter of 85% of that length and the bottom circle has a diameter of 75% of that length.

8. A dough cutter as in claim 6 in which the knife is activated by a sliding collar so that the collar must travel substantially twice as far to cause the knife to cross the top part of the outlet opening than to cross the bottom part of the outlet opening so that uniform movement of the sliding collar produces substantially faster movement of the knife in the bottom part of the outlet opening than in the top part so as to improve the cutting action of the knife.

* * * * *